Figure 2:
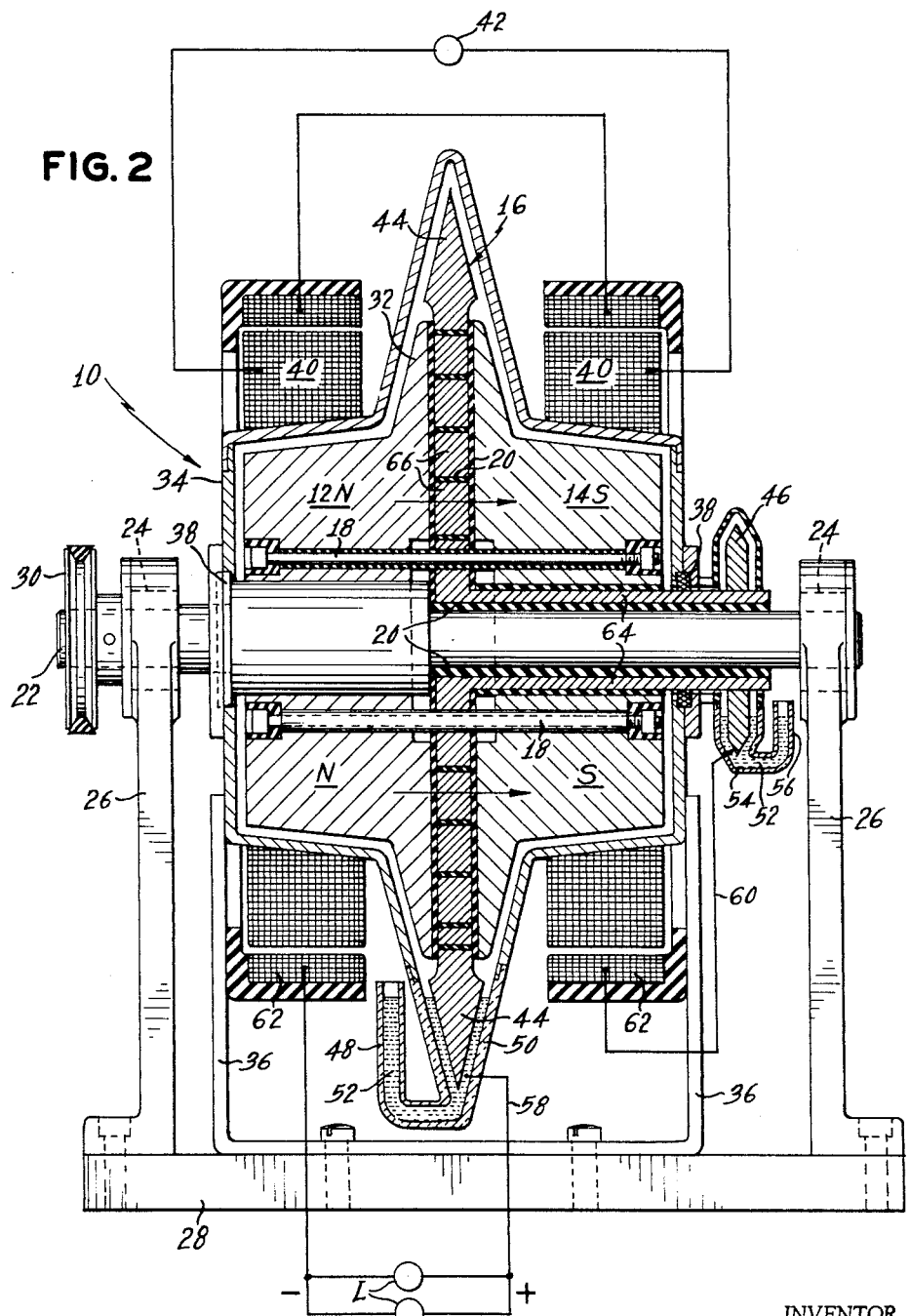

May 25, 1965   A. SEARS   3,185,877
DIRECT CURRENT HOMOPOLAR GENERATOR
Filed Jan. 14, 1963   2 Sheets-Sheet 1
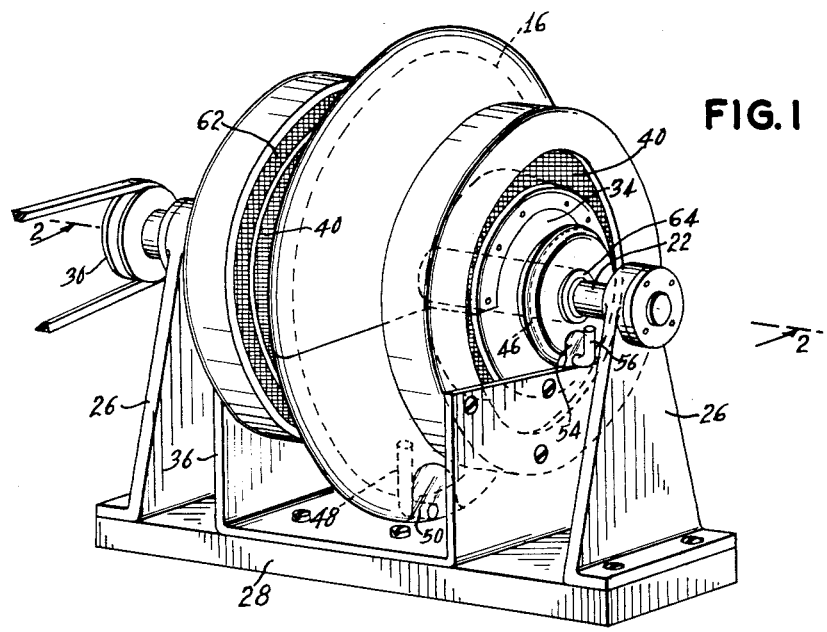
FIG. 1
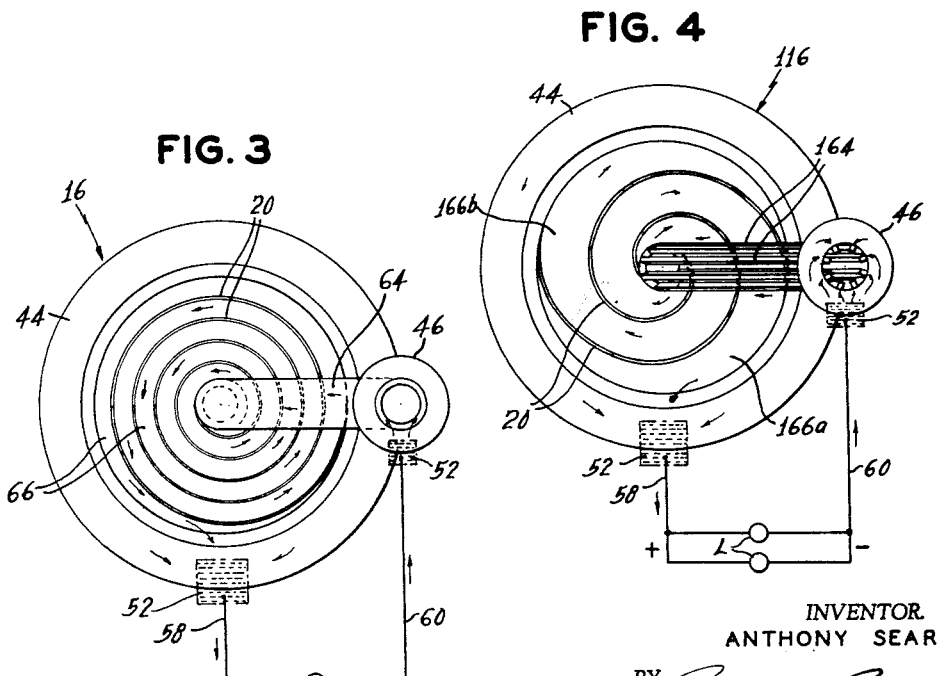
FIG. 3
FIG. 4
INVENTOR.
ANTHONY SEARS
BY Jerome Bauer
ATTORNEY May 25, 1965 A. SEARS 3,185,877
DIRECT CURRENT HOMOPOLAR GENERATOR
Filed Jan. 14, 1963 2 Sheets-Sheet 2

INVENTOR.
ANTHONY SEARS
BY *Jerome Bauer*
ATTORNEY

United States Patent Office 3,185,877
Patented May 25, 1965

3,185,877
DIRECT CURRENT HOMOPOLAR GENERATOR
Anthony Sears, New York, N.Y.
(88—00 Shore Front Parkway, Rockaway Beach, N.Y.)
Filed Jan. 14, 1963, Ser. No. 251,398
10 Claims. (Cl. 310—115)

This invention relates to homopolar generators and in particular to centrifugally operated direct current generators of the type disclosed in co-pending United States patent application Serial No. 21,759, filed April 12, 1960, now Patent No. 3,096,454.

The desideratum of this invention is to provide a homopolar or unipolar generator in which, although the rotor has no moving parts other than that of its own rotation, the voltage and amperage or current output of the generator is capable of being selectively and predeterminately varied.

Another purpose and object of the invention is to provide a generator in which non-solid brushes or current withdrawing contacts may be employed, thereby reducing brush wear and loss of operating time of the generator because of the necessity to repair or replace worn brush contacts. Accordingly, a feature of the invention resides in the ability to use fluid brush contacts or other non-solid electrolytic brush contacts that are not as susceptible to wear and break down as solid carbon type brush contacts in common use.

Still another object of the invention is to provide an inductor structure as an integral rotating part of the rotor and its magnetic field producing structure and wherein such inductor structure is constructed to enable the production of a desired current output.

Other and further objects of this invention reside in the structures and arrangements hereinafter more fully described with reference to the accompanying drawings in which:

FIG. 1 is a perspective view of a direct current generator constructed according to the teaching of the invention, FIG. 2 is a vertical cross section of FIG. 1, FIG. 3 is a perspective view of the inductor of FIG. 2, and FIG. 4 is a perspective view of a modified form of inductor structure.

Referring now to FIGS. 1, 2 and 3 of the drawings, the generator there shown is generally identified by the numeral 10. The generator 10 comprises a rotor structure that includes as integral and unitary rotating parts thereof, magnetic field producing means 12 and 14 composed of a magnetizable material, and a radially disposed or directed inductor structure generally identified by the numeral 16. The inductor structure 16 is securely mounted to and for simultaneous or conjoint rotation with the members 12 and 14 by bolts 18. The inductor structure 16 is fully insulated about all of its surfaces that are positioned adjacent to the magnetic field producing members 12 and 14 by the insulating material 20.

The rotor structure, as broadly described, is mounted on a non-ferrous or non-magnetic shaft 22. The shaft 22 is supported for rotation in bearings 24 that are contained in supporting arms 26 forming uprights of and connected to a base 28. The shaft 22 is rotated by any convenient drive mechanism (not shown), connected with a pulley 30 mounted at one end thereof and is insulated from the inductor 16 by the insulating material 20.

The rotor structure includes the magnetic field producing means 12 and 14, the inductor structure 16 and the rotating shaft 22, all of which rotate as a single unit and is held together by the bolts 18 that are adequately insulated along their lengths. The magnetic field producing means or members 12 and 14 are extended radially outward and tapered or narrowed in the direction of the radial outer periphery of the inductor structure 16. The narrowed tapered outwardly directed portions of the field producing members 12 and 14 are identified by the numeral 32 in accordance with the teaching of applicant's copending application. It is believed this arrangement enables or causes the electrons to move radially outward under centrifugal forces applied to them during the rotation of the rotor structure. As these electrons are caused to move radially outward, they are directed in their path of movement by the progressively narrowing portions 32 of the field producing members 12 and 14.

The rotor structure is enclosed in a non-magnetic housing 34 that is supported above the base 28 by brackets 36. The housing encloses substantially the whole of the rotor structure except that it permits the extension therebeyond of the axial ends of the shaft 22 and, in addition, a radial inwardly disposed portion of the inductor structure 16 for a purpose to be described. The housing 34 provides a fluid-tight cover about the principal portion of the rotor structure. To accomplish this, any suitable and convenient fluid seal 38 may be provided between the enclosing portions of the housing 34 about the shaft 22 and inductor structure 16 as diagrammatically shown in FIG. 2.

Mounted on the housing 34 that is held stationary by the brackets 36, is a set or pair of shunt coils 40 connected in series to an exciter 42 or suitable source of current. When the shunt coils 40 are energized, a magnetic field is caused to be produced by the members 12 and 14. The magnetic field is unidirectional and moves in the direction from the north pole member 12 to the south pole member 14 and directed through the inductor structure 16 positioned therebetween. The inductor structure 16 includes a pair of radially spaced contacts or contact elements 44 and 46. The contact 44 is positioned on the inductor structure 16 at a greater outward radial distance than the contact 46.

During the rotation of the rotor structure, a direct current is induced in the inductor structure 16 as disclosed in the aforementioned co-pending application. The induced current is capable of being withdrawn from the inductor structure by placing an electrically conductive brush element in engagement with the contact 44 and completing a circuit across the inductor structure 16 by connecting a further brush in engagement with the contact 46. In the prior art, carbon type brush contacts have been commonly employed for the purpose of withdrawing current from a generator. However, because of the extremely high speeds of rotation and the constant brush engagement with the generator armature, the brush contacts tend to wear rapidly and require frequent repair and replacement. To do this, it is necessary to shut down the operation of the generator and perform the repair work. The procedure is costly in time and in the loss of use of the generator equipment.

The present invention enables the use of a fluent or flowing type of non-solid electrolytic brush elements for engagement with the continuous contacts 44 and 46. In referring to FIG. 2 of the drawing, it will be noted that the housing 34 encompassing and enclosing the rotor structure is provided with a stand pipe 48 that may be in the form of a sight glass through which an electrically conductive fluid or non-solid electrolytic type material, as mercury, may be poured into and visually observed at a lower insulated brush holder 50 defined as an integral part of the housing. The non-solid brush contact material 52 will flow about the contact 44 of the inductor structure 16 and remain in constant flowing engagement with the same during the rotation of the rotor structure and the inductor structure 16.

In a similar manner, an insulated brush contact holder 54 is provided about the portion of the inductor structure 16 that extends axially beyond the housing 34 and encompasses the radial inner inductor contact 46 fluid-tightly. The insulated holder 54 is formed with a stand pipe type sight glass 56 through which the fluent electrically conductive non-solid electrolytic brush material 52 may be supplied to and observed in the holder for engagement with the periphery of the inductor contact 46. Thus, both contacts 44 and 46 of the inductor structure 16 are constantly engaged by a fluid or flowing type non-solid electrically conductive material that performs the same function as the well known solid carbon type electrical brush contacts commonly used in generators. Because of the fluent and non-solid nature of the brush contact material 52, the problem of brush wear is obviated. The loss of brush contact material 52 by evaporation or disintegration is overcome by the ability to continually supply additional brush contact material 52 to the respective holders 50 and 54 by way of the stand pipe sight glasses 48 and 56 respectively.

Naturally, those skilled in the art will recognize that solid type brush contacts may be utilized in the present invention without doing violence to its teaching. However, the fluent, non-solid brush contacts here described have been found to be practical and successful, eliminating much of the problems of brush wear formerly encountered in well known generators, and the costly "down time" necessary to replace or repair such brush contacts.

Each brush holder 50 and 54 has connected to it a conductor 58 and 60 respectively that enable a current to be withdrawn and supplied to one or more loads L to complete a circuit through the loads and the contacts 44 and 46 of the generator inductor structure 16. In order to assure the steady application of energizing voltage to the north and south magnetic field producing members 12 and 14 and to compound the magnetism in such members by aiding the shunt coils 40, there is provided a pair of series coils 62 that are connected in series with the conductors 58 and 60 and across the loads L.

In the embodiment of FIGS. 1, 2 and 3, the inductor structure thereshown is provided with an axially extending tubular shaped electrically conductive element 64 that is insulated at 20 from the shaft passing therethrough. The end of the tubular shaped element 64 carries as a unitary part thereof, the radial inner contact 46. The tubular electrically conductive element extends from the contact 46 inward toward the center of the rotor and there is formed as a single element having a plurality of turns 66 each wound spirally, one over the other, until the last turn merges with and electrically engages the annularly shaped radially disposed outer contact 44. Each of the turns 66 of the electrically conductive inductor element 64 is insulated from the other by the insulating material 20.

The spiral turns 66 are formed of a single electrically conductive element, which because of its longer length resulting from its many turns, will produce a higher voltage and a lower current than an inductor element that is made or constructed with a shorter effective length resulting perhaps from less turns. Thus, the electrically conductive inductor element 66 extends from the radial inner contact 46 to the radial outer contact 44 to complete a circuit between them. The values of the voltage and current to be produced by the instant generator 10, withdrawn at the contacts 44 and 46 by the brush contact material 52, and supplied to the load L can be intricately controlled by predeterminately selecting the length of the inductor element 66.

Referring now to the embodiment shown in FIG. 4, the inductor structure there disclosed is generally identified by the numeral 116. The inductor structure 116 is substantially the same in construction as that of the previously described inductor structure 16 except, however, that the radial outer contact 44 is connected with the radial inner contact 46 by one or more or by a plurality of electrically conductive elements 166a and 166b. Each one of the conductive elements 166a and 166b has a plurality of turns that are spirally wound over and insulated from the other by the insulating material 20.

In the embodiment of the inductor structure 116 shown in FIG. 4, it will be recognized that the inductor elements 116a and 116b form a double spiral or double start, of which each spiral is wound over the other and extends from one of the radially disposed contacts 44 to the other contact 46 to connect the same in an electrical circuit. The inner ends of each of the spiralled conductor elements 166a and 166b are axially connected with the radial inner contact 46 by a plurality of axially disposed circumferentially spaced conductors 164 which function like the previously described tubular element 64 of the inductor structure 16. The function of the inductor structure 116 is substantially the same as that previously described in the embodiment 16. However, because of the relatively shorter effective length of each of the conductive elements 166a and 166b, the inductor structure 116 will be able to produce a relatively lower voltage but a relatively higher current than the inductor 16 previously described.

To those who are skilled in the art, it should be readily obvious that the description of the turns 66 of the inductor structure 16 and the multiple inductor elements 166a and 166b of the inductor structure 116 should provide no limitation upon the scope of the teaching of the invention. It is entirely possible that the inductor structure 16 may include, instead of the spiral turns of the electrically conductive elements described, a plurality of closely wound turns of electrically conductive wire. Such wire turns may be provided on the faces of the inductor structure 16 in the unidirectional path of magnetic flux produced by the north and south pole members 12 and 14. Such ampere turns of wire may be positioned closer together than the turns of the element 66 or element 166a and 166b thereby resulting in a longer effective length of wire and, in consequence, enable the present invention to produce an extremely high voltage. In addition, because the electrically conductive ampere turns of wire are capable of being closely spaced together along the radial extent of the inductor structure 16, there may be a number of such conductive wire elements spiralled one over the other in the manner as taught by the plurality of inductor elements 166a and 166b of the embodiment of the inductor structure 116.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

I claim:

1. In a direct current homopolar generator, rotatable inductor means, rotatable magnetic field producing means to produce a magnetic field on opposite axial sides of said inductor means, said magnetic field producing means having a unidirectional flux path moving in the direction of the axis of rotation thereof and being interrupted by and extending through said inductor means, means securing said inductor means and said magnetic means together to cause the same to rotate unitarily in the same direction and at the same speed, means housing said inductor means, electrically conductive means contained by said housing in contact with said inductor means at different radial distances thereof, and means connected with said electrically conductive means to complete a circuit therebetween.

2. In a direct current homopolar generator as in claim 1, said inductor having a plurality of turns each of which is insulated from the other and extends from one of said different radial distances to the other.

3. In a direct current homopolar generator as in claim 2, said plurality of turns each being spirally wound, and means between said spirally wound turns insulating the same from each other.

4. In a direct current homopolar generator as in claim 1, said inductor including a plurality of electrically conductive elements each of which is spirally wound over the other and extends from one of said different radial distances to the other, and means between said spiral windings of said plurality of elements to insulate the same from each other.

5. A direct current homopolar generator comprising a rotor including unitarily-rotated energizable axially spaced magnetic field producing means and radially-directed inductor means in the space between said magnetic field producing means, means to rotate said rotor, means to energize said magnetic field producing means to produce a magnetic field in an axial direction through said inductor means in said space, said inductor means having a plurality of contacts each of which is disposed in radial inward and outward relationship with respect to the other and rotatable with said inductor, electrically conductive fluent brush means engaging said contacts, means housing said rotor during the rotation thereof and retaining said fluent brush means in electrical engagement with said plurality of contacts during their rotation, and means connected with said brush means to complete a circuit therebetween.

6. A direct current homopolar generator as in claim 5, said inductor including at least an electrically conductive element extending from said radial inward contact to said radial outward contact to complete a circuit therebetween.

7. A direct current homopolar generator as in claim 5, said inductor including an electrically conductive element being spirally wound on said rotor in said radial direction extending from said radial inward contact to said radial outward contact, and means between said windings of said electrically conductive element to insulate the same.

8. A homopolar generator comprising a rotatable rotor, including radially disposed inductor means and means on opposite axial sides of said inductor means energizable to produce a magnetic field in a direction axially through said inductor means, a housing in which said rotor rotates, means to rotate said rotor, means on said housing to energize said energizable means, said inductor means including an electrically conductive element wound with a plurality of turns in a spiral form, said inductor means having a plurality of circularly shaped contact surfaces, one of said contact surfaces being on said inductor means at a greater outward radial distance than another of said contact surfaces, an electrical contact means in said housing engaging each one of said contact surfaces, and means connecting each of said contact means to complete a circuit therebetween.

9. A homopolar generator as in claim 8, said electrical contact means being an electrolytic fluid.

10. A homopolar generator as in claim 9, axially disposed electrically conductive means connecting said element with the contact surface at the lesser radial distance.

References Cited by the Examiner
UNITED STATES PATENTS

| 341,097 | 5/86 | De Ferranti | 310—178 |
| 806,217 | 12/05 | Wait | 310—178 |
| 859,368 | 7/07 | Collins | 310—115 |
| 2,588,466 | 3/52 | Barnes | 310—178 |

OTHER REFERENCES

Direct Current Machinery, Pender, page 248, John Wiley & Sons, 1928.

MILTON O. HIRSHFIELD, *Primary Examiner.*